(12) United States Patent
Ruopp (10) Patent No.: US 9,574,631 B2
(45) Date of Patent: Feb. 21, 2017

(54) BRAKE CALIPER

(71) Applicant: Gustav Magenwirth GMBH & Co. KG, Bad Urach (DE)

(72) Inventor: Michael Ruopp, Berghülen (DE)

(73) Assignee: Gustav Magenwirth GmbH & Co. KG (DE)

( * ) Notice: Subject to any disclaimer, the term of this patent is extended or adjusted under 35 U.S.C. 154(b) by 31 days.

(21) Appl. No.: 14/558,210

(22) Filed: Dec. 2, 2014

(65) Prior Publication Data

US 2015/0122596 A1    May 7, 2015

Related U.S. Application Data

(63) Continuation of application No. PCT/EP2013/061365, filed on Jun. 3, 2013.

(30) Foreign Application Priority Data

Jun. 2, 2012 (DE) .................. 10 2012 209 341

(51) Int. Cl.
| | |
|---|---|
| F16D 65/097 | (2006.01) |
| F16D 65/58 | (2006.01) |
| F16D 55/225 | (2006.01) |
| F16D 65/00 | (2006.01) |
| F16D 55/00 | (2006.01) |

(52) U.S. Cl.
CPC .............. F16D 65/58 (2013.01); F16D 55/225 (2013.01); F16D 65/0068 (2013.01); F16D 65/097 (2013.01); *F16D 2055/0029* (2013.01)

(58) Field of Classification Search
CPC .. F16D 55/225; F16D 65/0068; F16D 65/092; F16D 65/095; F16D 65/097

USPC .............. 188/73.36–73.38, 250 B, 250 D, 250 G, 188/73.39

See application file for complete search history.

(56) References Cited

U.S. PATENT DOCUMENTS 5,188,202 A * 2/1993 Terashima .............. B60T 1/065
                                        188/73.32
8,413,771 B2 * 4/2013 Teagan .................. F16D 55/225
                                        188/264 A
(Continued)

FOREIGN PATENT DOCUMENTS

| DE | 1194275 B | 6/1965 |
|---|---|---|
| DE | 3124631 A1 | 1/1983 |

(Continued)

OTHER PUBLICATIONS

International Search Report and Written Opinion of the International Bureau of WIPO for International Application No. PCT/EP2013/061365 dated Dec. 2, 2014.

(Continued)

*Primary Examiner* — Christopher Schwartz
(74) *Attorney, Agent, or Firm* — Mayback & Hoffman, P.A.; Gregory L. Mayback (57) ABSTRACT

A brake caliper of a hydraulic brake system comprises several pistons, each of which is slidably disposed in a cylinder along the axis of the cylinder, several brake pads that are forced against a brake disk by the pistons upon actuation of the brake, and at least one spring device having a base and opposite legs that extend from the base to the brake pads. The opposite legs extend from a side of the base to a brake pad that is disposed on the opposite side.

19 Claims, 9 Drawing Sheets

(56) References Cited

U.S. PATENT DOCUMENTS

| | | | |
|---|---|---|---|
| 8,550,220 B2* | 10/2013 | Iwai | F16D 65/092 188/218 XL |
| 2005/0139438 A1* | 6/2005 | Schorn | F16D 55/227 188/73.47 |
| 2008/0156595 A1* | 7/2008 | Matsuzaki | F16D 65/092 188/73.37 |

FOREIGN PATENT DOCUMENTS

| | | |
|---|---|---|
| DE | 19505318 A1 | 8/1996 |
| DE | 10033834 A1 | 6/2001 |
| DE | 102004040422 A1 | 3/2006 |
| DE | 102005044150 A1 | 3/2006 |
| DE | 102011000547 A1 | 8/2012 |
| FR | 2555271 A3 | 5/1985 |
| JP | 2002031171 A | 1/2002 |
| JP | 2002174280 A | 6/2002 |
| JP | 2005291331 A | 10/2005 |
| JP | 2012189188 A | 10/2012 |
| WO | 2010073277 A1 | 7/2010 |

OTHER PUBLICATIONS

Search Report of the German Patent and Trademark Office for German Application No. 10 2012 201 341.9, dated Mar. 22, 2013.

* cited by examiner

Fig. 24

BRAKE CALIPER

CROSS-REFERENCE TO RELATED APPLICATIONS

This is a continuing application, under 35 U.S.C. §120, of copending international application No. PCT/EP2013/061365 filed on Jun. 3, 2013, which designated the United States and was not published in English; this application also claims the priority, under 35 U.S.C. §119, of German Application No. 10 2012 209 341.9 filed on Jun. 2, 2012, the prior applications are herewith incorporated by reference in their entirety.

STATEMENT REGARDING FEDERALLY SPONSORED RESEARCH OR DEVELOPMENT

Not Applicable

FIELD OF THE INVENTION

The present systems and methods lies in the field of brakes. The present disclosure relates to a brake caliper of a hydraulic bicycle brake or a hydraulic brake of vehicles steered by handlebars, and further, preferably, to a brake caliper of a hydraulic bicycle disk brake.

BACKGROUND OF THE INVENTION

Hydraulic bicycle disk brakes are known to bias the brake pads by a spring device against respective pistons. As a result, the brake pads always abut against the piston so as to avoid a rattling noise and ensure a sliding-free operation of the brake pad. In this connection, it is important to adjust the force of the spring device such that it is smaller than the return force of the piston so as not to markedly influence the return function of the pressure chamber gasket surrounding the piston. At the same time, the force of the spring device should be high enough to ensure a good abutment of the brake pad against the piston.

Known spring devices have a base from which, for each brake pad, two legs extend in approximately perpendicular fashion to the base along the edges of the pads of the brake pads such that the pad is framed by the two legs. Two projections are provided at the ends of the legs and engage behind the pads. These known spring devices have a drawback in that they require a relatively large available space. Therefore, such spring devices are disadvantageous, in particular for four-piston brake calipers where four individual pads are provided.

Thus, a need exists to overcome the problems with the prior art systems, designs, and processes as discussed above.

SUMMARY OF THE INVENTION

The systems and methods described provide a brake caliper that overcomes the hereinafore-mentioned disadvantages of the heretofore-known devices and methods of this general type and that has a spring device that serves for biasing the brake pads and provides a sufficient spring force while having a relatively small available space.

With the foregoing and other objects in view, there is provided, a brake caliper of a hydraulic brake system, comprising several pistons, all of which are slidably disposed in a cylinder along the cylinder axis, several brake pads that are forced against a brake disk by the pistons upon actuation of the brake, and at least one spring device having a base and opposite legs that extend from the base to the brake pads, wherein the opposite legs extend from a base side to a brake pad that is disposed on the opposite side.

With the objects in view, there is also provided a brake caliper of a hydraulic brake system, comprising several pistons, all of which are slidably disposed in a cylinder along the cylinder axis, several brake pads that are forced against a brake disk by the pistons upon actuation of the brake, and at least one spring device having a base and opposite legs that extend from the base to the brake pads, wherein the opposite legs of the spring device are staggered with respect to one another.

With the objects in view, there is also provided a brake caliper of a hydraulic brake system, comprising several pistons, all of which are slidably disposed in a cylinder along the cylinder axis, several brake pads that are forced against a brake disk by the pistons upon actuation of the brake, and at least one spring device having a base and opposite legs that extend from the base to the brake pads, wherein each of the legs has a bending region and a counter-bending region.

With the objects in view, there is also provided a brake caliper of a hydraulic brake system, comprising several pistons, all of which are slidably disposed in a cylinder along the axis of the cylinder, several brake pads that are forced against a brake disk by the pistons upon actuation of the brake, and at least one spring device having a base and opposite legs that extend from the base to the brake pads, wherein each of the opposite legs has a bending region, the distance of which is greater than the distance of the two corresponding opposite brake pads against which the legs abut.

With the objects in view, there is also provided a brake caliper of a hydraulic brake system, comprising several pistons, each of which is slidably disposed in a cylinder along the cylinder axis, several brake pads that are forced against a brake disk by the pistons upon actuation of the brake, and bridges that connect the opposite portions for the brake caliper with one another, wherein the bridges have at least one and preferably several cooling fins.

This embodiment has the advantage that good cooling can be achieved while the available space is very small.

All of these embodiments of the invention have the advantage that the largest possible pad surface can be designed while the available space is small, wherein a good force application of the spring device to the brake pads is simultaneously guaranteed.

In accordance with another feature, the brake caliper includes a synopsis of the above mentioned features. According to the invention, it is also possible to only provide any sub-combination of said features.

In accordance with a further feature, the opposite legs can extend from a side of the base to a brake pad that is disposed on the opposite side.

In accordance with an added feature, the opposite legs of the spring device can be staggered with respect to one another.

In accordance with an additional feature, each of the legs can have a bending region and a counter-bending region.

In accordance with yet another feature, each of the opposite legs have a bending region, the distance of which is greater than the distance of the two corresponding opposite brake pads against which the legs abut.

In accordance with yet a further feature, the bending regions can extend over an angular range of more than 120 degrees, over an angular range of more than 150 degrees, and over an angular range of about 160 degrees.

In accordance with yet an added feature, the counter-bending regions can extend over an angular range of more than 30 degrees, over an angular range of more than 60 degrees, and over an angular range of about 70 degrees.

Known brake calipers have the problem that the brake calipers strongly heat up in the case of extreme brake actuations, e.g., in long downhill rides. The problem of heat dissipation is not solved satisfactorily in the prior art.

The systems and methods described provide a brake caliper where good cooling and a small available space are achieved.

In accordance with yet an additional feature, the brake caliper can have four pistons that are disposed in two opposite cylinder pairs.

In accordance with again another feature, the brake caliper can have four brake pads assigned to one piston each.

In accordance with again a further feature, the brake pads can have a divided brake pad, between which a groove extends to receive a leg of the spring device.

In accordance with again an added feature, the ends of the legs can have holding portions. The latter can engage the lower edge of the brake pads. In this case, the legs extend in a groove that is provided between pad parts of the brake pad or is formed in the pad. Alternatively or additionally, the holding portions can engage in engagement openings in the pad support. The engagement openings can be provided in recesses of the pad. Because the legs are made shorter in these embodiments, it is advantageous for the base of the spring device to be wider to have the pivot points and/or bending portions of the opposite legs disposed more widely apart.

In accordance with a concomitant feature, a hydraulic brake, in particular a hydraulic disk brake, has a brake caliper according to the above.

Although the systems and methods are illustrated and described herein as embodied in a brake caliper, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems and methods.

Additional advantages and other features characteristic of the systems and methods will be set forth in the detailed description that follows and may be apparent from the detailed description or may be learned by practice of exemplary embodiments. Still other advantages of the systems and methods may be realized by any of the instrumentalities, methods, or combinations particularly pointed out in the claims.

Other features that are considered as characteristic for the systems and methods are set forth in the appended claims. As required, detailed embodiments of the systems and methods are disclosed herein; however, it is to be understood that the disclosed embodiments are merely exemplary of the systems and methods, which can be embodied in various forms. Therefore, specific structural and functional details disclosed herein are not to be interpreted as limiting, but merely as a basis for the claims and as a representative basis for teaching one of ordinary skill in the art to variously employ the systems and methods in virtually any appropriately detailed structure. Further, the terms and phrases used herein are not intended to be limiting; but rather, to provide an understandable description of the systems and methods. While the specification concludes with claims defining the systems and methods of the invention that are regarded as novel, it is believed that the systems and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems and methods. Advantages of embodiments of the systems and methods will be apparent from the following detailed description of the exemplary embodiments thereof, which description should be considered in conjunction with the accompanying drawings in which.

DETAILED DESCRIPTION OF THE INVENTION

As required, detailed embodiments of the systems and methods are disclosed herein; however, it is to be understood that the disclosed embodiments are merely exemplary of the systems and methods, which can be embodied in various forms. Therefore, specific structural and functional details disclosed herein are not to be interpreted as limiting, but merely as a basis for the claims and as a representative basis for teaching one skilled in the art to variously employ the systems and methods in virtually any appropriately detailed structure. Further, the terms and phrases used herein are not intended to be limiting; but rather, to provide an understandable description of the systems and methods. While the specification concludes with claims defining the features of the systems and methods that are regarded as novel, it is believed that the systems and methods will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the systems and methods will not be described in detail or will be omitted so as not to obscure the relevant details of the systems and methods.

Before the systems and methods are disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the systems and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Figure 1:
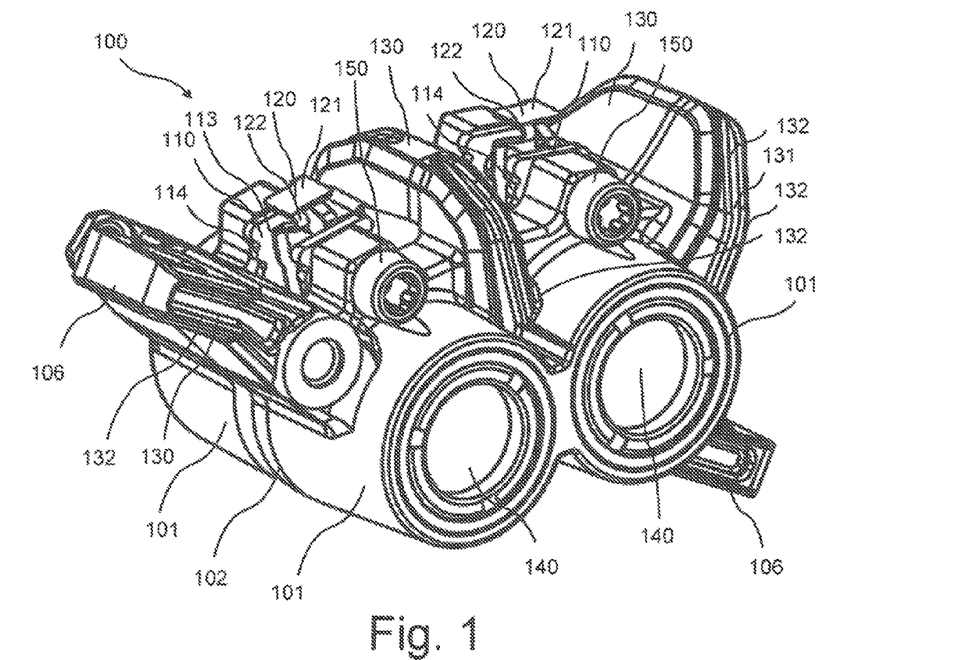
FIG. 1 is a perspective view of an exemplary embodiment of a brake caliper at an angle from above.
Figure 2:
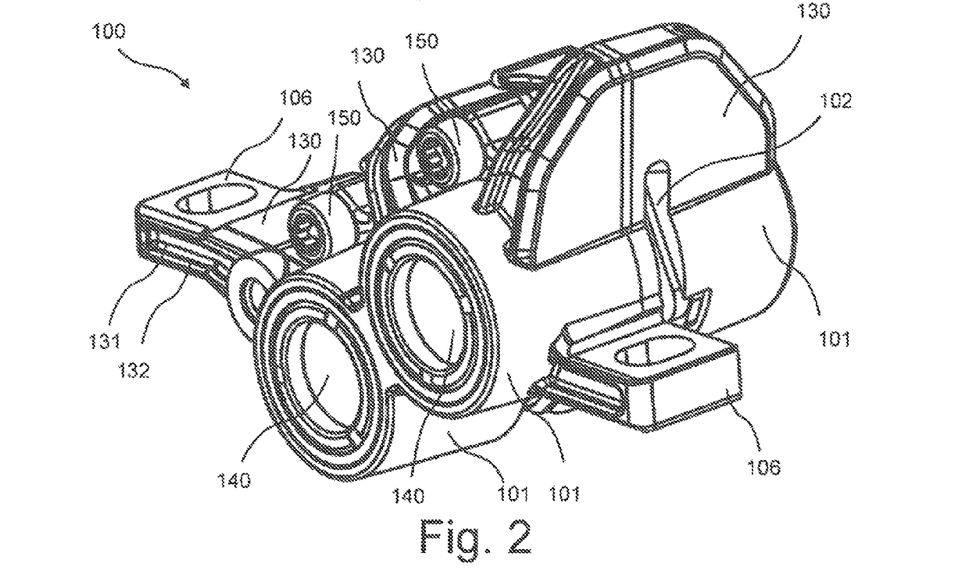
FIG. 2 is a perspective view of the brake caliper of FIG. 1 at an angle from below.

The following reference signs are used in the description of the exemplary embodiments:
100 brake caliper
101 cylinder
102 brake shaft
103 pressure chamber
104 groove
105 chamfer
106 connecting portion
107 bolt support
110 brake pad
111 support
112 pad support area
113 projection
114 corrugation
115 attachment opening
116 lower edge
117 engagement opening
118 pad
119 groove
1191 recess
120 spring device
121 base
122 bending region
123 counter-bending region
124 leg
125 reinforcement
126 flute
127 locking portion
128 holding portion
130 bridge
131 recess
132 cooling fin (at the edge)
133 cooling fin (in the center)
140 cover
141 closure element
142 screen
143 threaded portion
144 tool engagement portion
150 bolt
151 shaft
152 head
153 thickening Described now are exemplary embodiments. Referring now to the figures of the drawings in detail, there is shown a first exemplary embodiment of a brake caliper 100 having four paired oppositely disposed cylinders 101. A brake shaft 102 is disposed between the cylinders 101 and a brake disk (not shown) rotates therein.

The cylinders 101 accommodate pistons (not shown) that move along the axis of the corresponding cylinder 101 upon actuation of the brake and force one brake pad 110 each against the brake disk to delay the movement thereof. When the brakes are released, the pistons return into the corresponding cylinders 101. To have the brake pads not rattle, they are biased against the piston by a spring device 120.

Figure 21:
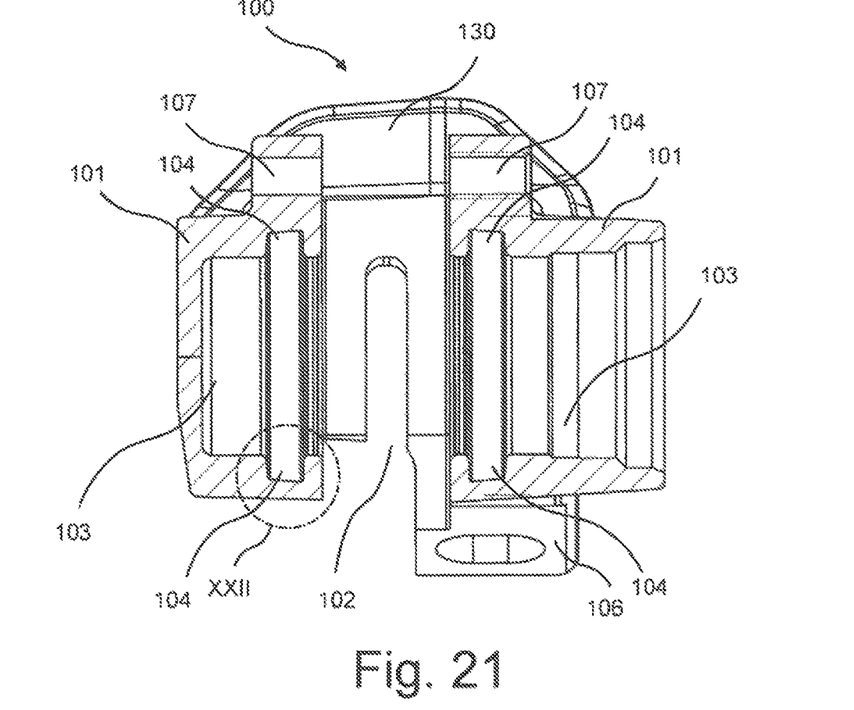
FIG. 21 is a cross-sectional view through the brake caliper of FIG. 1 through a central plane of a cylinder pair.

Each of the cylinders 101 has a pressure chamber 103 and a groove 104 (for example, in FIG. 21). A gasket (not shown) is provided in the groove 104 and seals the pressure chamber 103 against the piston.

Figure 22:
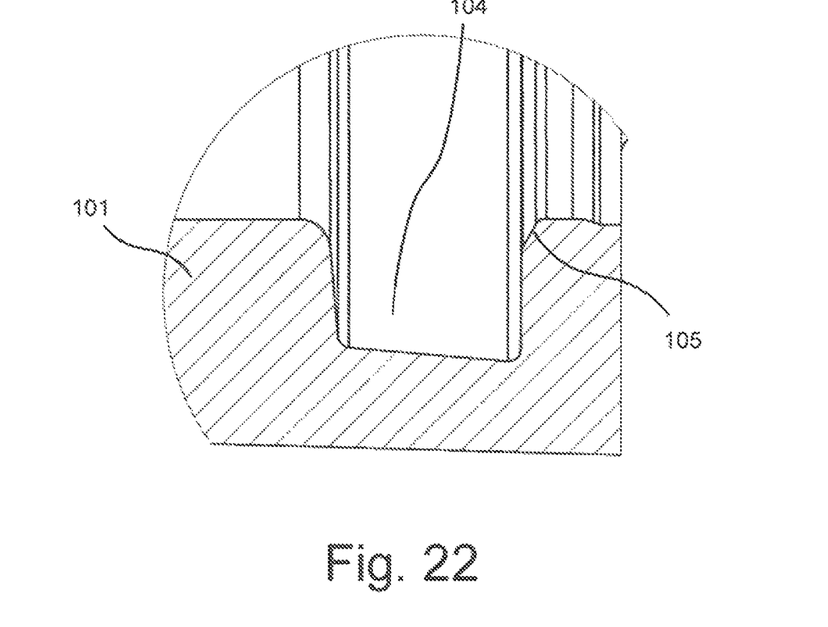
FIG. 22 is a fragmentary, enlarged, cross-sectional view of a portion of the brake caliper of FIG. 21 within sectional circle XXII.

As can best be seen in FIG. 22, the groove 104 has a chamfer 105 where the gasket is disposed while braking. When the brake is released, the gasket returns into its unstressed position, thus pulling the piston away from the brake disk. The brake pad 110 is biased against the piston by the spring device 120 and, thus, is also pulled away from the brake disk when the braking operation is concluded.

According to an exemplary aspect, the chamfer has an angle of approximately 30° while known chamfers have an angle of somewhat more than 45°. In addition, the width of the chamfer (i.e., the dimension along the axis of the cylinder) according to this aspect of the invention is only approximately 0.3 mm while known chamfers have a width of approximately 0.6 mm. This exemplary embodiment has the advantage that a smaller air gap is formed and the brake responds more rapidly and more accurately.

The brake caliper 100 has two connecting portions 106 by which it can be attached in known manner to the base of a fork or to the rear portion of a bicycle.

Figure 11:
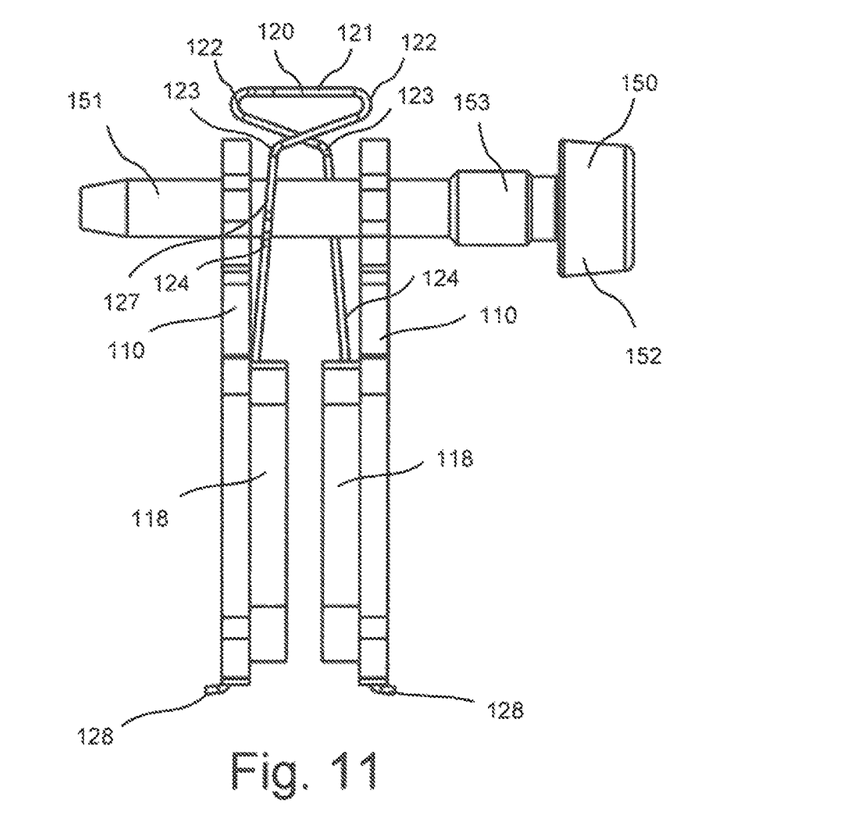
FIG. 11 is a side elevational view of an exemplary embodiment of two brake pads with a spring device and a bolt of the brake caliper of FIG. 1 from a direction corresponding to the direction of rotation of the brake disk.
Figure 12:
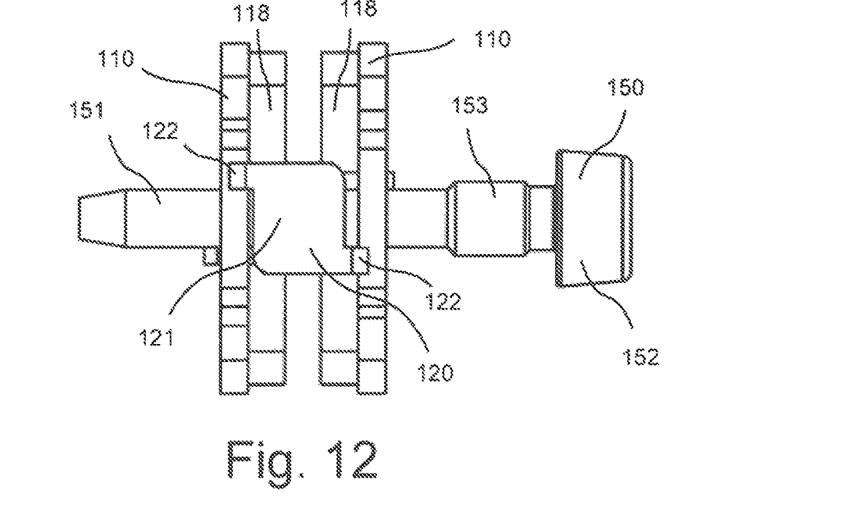
FIG. 12 is a top plan view of the parts of FIG. 11.
Figure 13:
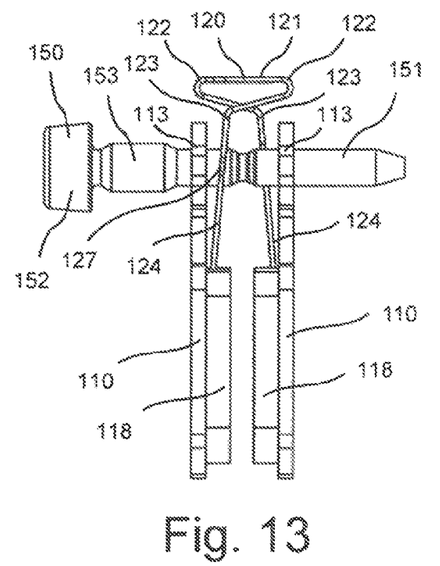
FIG. 13 is a side elevational view with brake pads according to FIG. 10 and a corresponding spring device according to the alternative embodiment of FIG. 10, the view corresponding to the view of FIG. 11.
Figure 14:
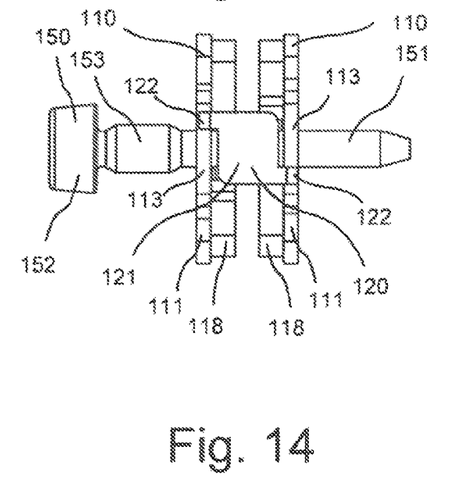
FIG. 14 is a top plan view of the parts illustrated in FIG. 13 corresponding to the view of FIG. 12.
Figure 15:
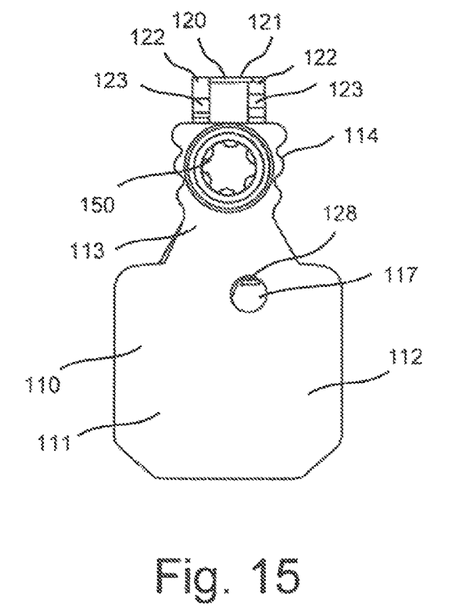
FIG. 15 is a side elevational view of the parts shown in FIG. 13 from a direction of the piston acting on the brake pad, i.e., the pads are hidden by the brake pad support.
Figure 16:
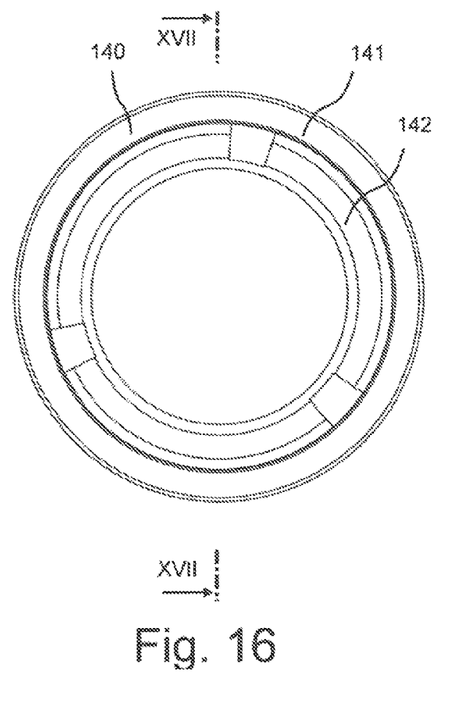
FIG. 16 is a plan view of an exemplary embodiment of a closure with a screen of the brake caliper of FIG. 1.
Figure 17:
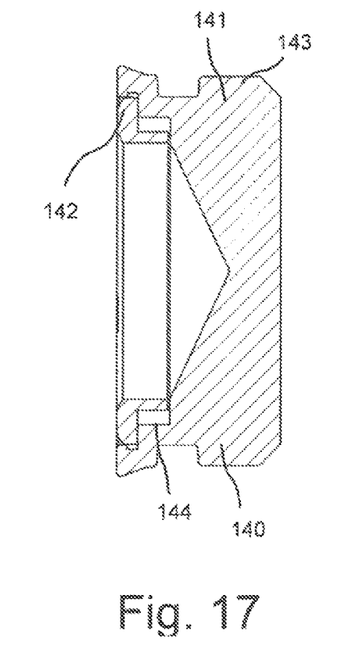
FIG. 17 is a cross-sectional view through the closure and screen of FIG. 16 along section line XVII-XVII.
Figure 18:
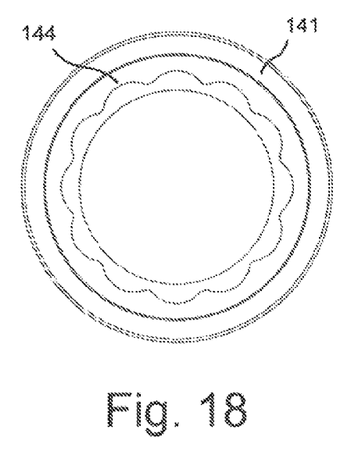
FIG. 18 is a side elevational view of the closure of FIG. 16 without the screen of FIG. 16.
Figure 19:
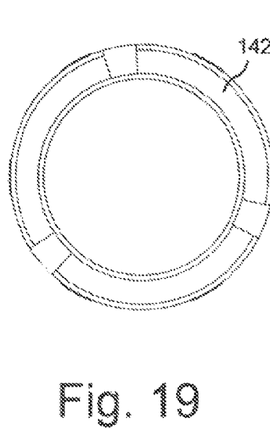
FIG. 19 is a plan view of the screen of the closure of FIG. 16.
Figure 20:
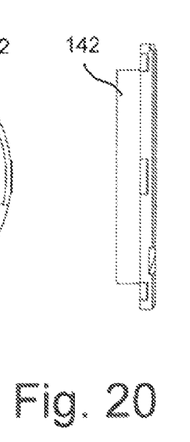
FIG. 20 is a side elevational view of the screen of FIG. 19.

Bolt supports 107 are provided in the brake caliper 100, as can best be seen in FIG. 21. The bolt supports 107 accommodate bolts 150 that, as can be seen in FIGS. 11 and 12, hold the brake pads 110 and the spring device 120. For the sake of overview, the brake caliper 100 is not shown in FIGS. 11 and 12 in order to better see the interplay between the bolt 150, the brake pads 110, and the spring device 120.

Each of the bolts 150 has a shaft 151, a head 152 and a thickening 153. In each case, a pair of brake pads 110 and an associated spring device 120 are disposed on the brake caliper 100 by the bolt 150.

As can best be seen in FIGS. 7 to 9 and 11 to 12, the brake pads 110 have a support 111. The support has a pad support area 112 and a projection 113. The projection 113 is provided with a corrugation 114. This corrugation 114 has the advantage that the brake pad 110 can be gripped better with fingernails so that the brake pad 110 can be held better when inserted and removed by a user and does not slip into the brake shaft. This corrugated surface on the projection 113 is not known in the prior art and can substantiate an independent invention.

Figure 7:
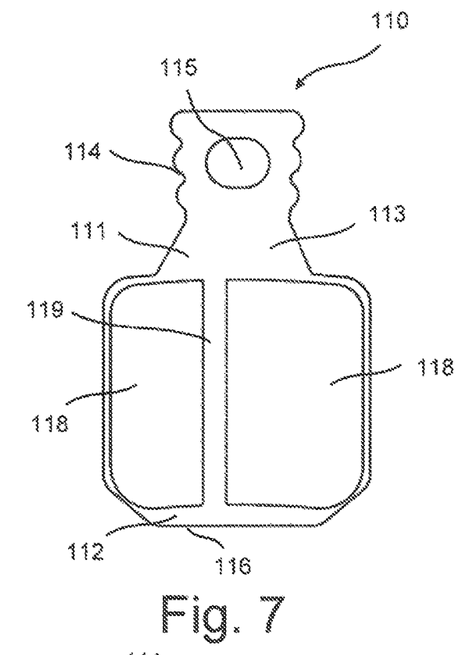
FIG. 7 is a side elevational view of a brake pad of the brake caliper of FIG. 1 in a view in a direction of movement of the piston.
Figure 8:
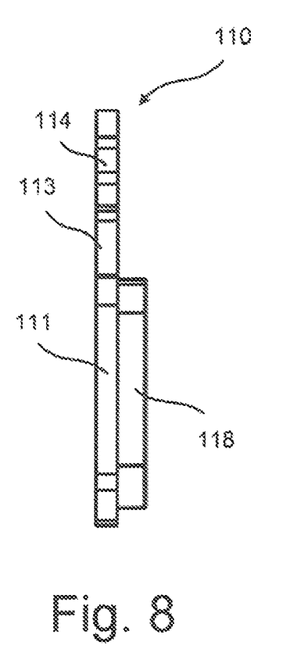
FIG. 8 is a front elevational view of the brake pad of FIG. 7 in a view from a direction corresponding to a direction of rotation of a brake disk.
Figure 9:
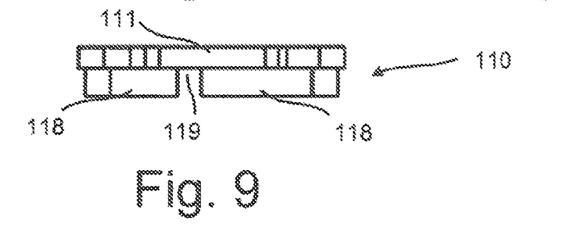
FIG. 9 is a top plan view of the brake pad of FIG. 7.
Figure 10:
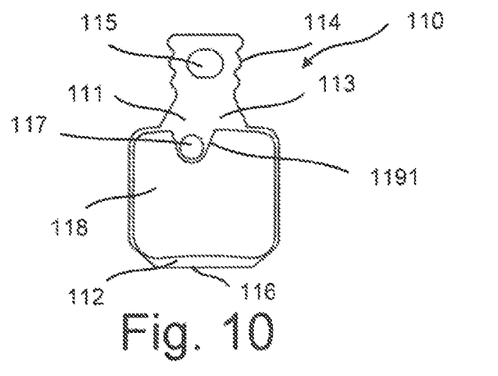
FIG. 10 is a view of a brake pad according to an alternative exemplary embodiment in a view that corresponds to the view of FIG. 7.

An attachment opening 115 is provided in the projection 113. The bolt 150 reaches through this opening by its shaft 151 to dispose the brake pad 110 on the brake caliper 100 when the bolt 150 engages in the bolt supports 107.

The brake pad 110 has a lower edge 116 where holding portions 128 of the legs 124 of the spring device 120 engage to secure the brake pad when the bolt 150 is pulled out of the bolt supports 107 to exchange the brake pads 110, for example.

A pad 118 is disposed on the pad support area 112 and is divided into two parts. A groove 119 extends between the two parts of the pad 118 and a leg 124 of the spring device 120 is disposed therein.

According to exemplary embodiments that are not illustrated, the groove 119 is not formed through the entire thickness of the pad 118 but is only sufficiently deep to be a recess in the pad 118, which suffices to receive the leg 124 up to a certain desired wear of the pad 118.

FIGS. 10 and 13 to 15 show details of an alternative embodiment of the brake caliper 100, wherein, in connection with these figures, substantially only the differences with respect to the embodiments that are described in connection with the other figures are explained and, as for the rest, reference is made to the description thereof.

According to the alternative shown in FIGS. 10 and 13 to 15, the brake pad 110 has an engagement opening 117 where the holding portion 128 of the leg 124 of the spring device 120 can engage. In this embodiment, the legs 124 of the spring device 120 are shorter and the base 121 of the spring device 120 is wider as compared to the exemplary embodiment shown in FIGS. 7 to 9 and 11 to 12. The pad 118 has a recess 1191 in which the engagement opening is formed. This embodiment has an advantage in that the available pad area for braking is larger.

Figure 3:
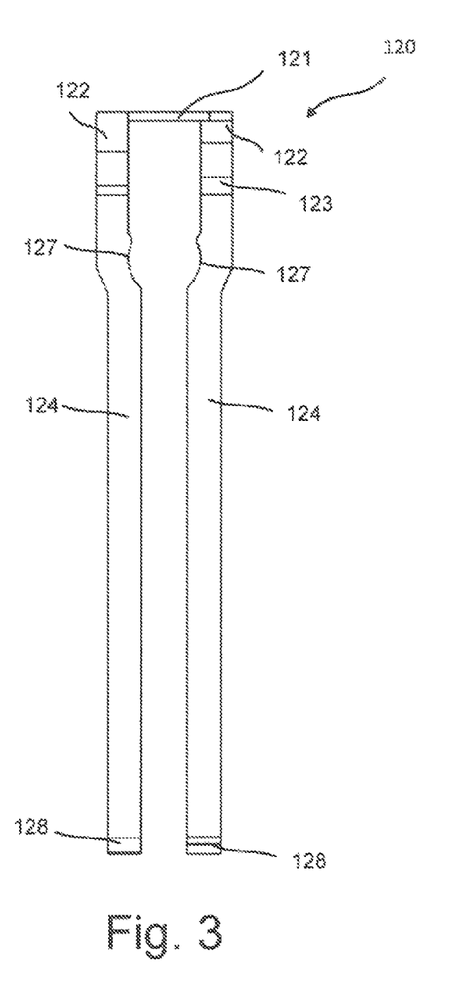
FIG. 3 is a side elevational view of an exemplary embodiment of a spring device of the brake caliper of FIG. 1 at, for example, in a direction of piston movement.
Figure 4:
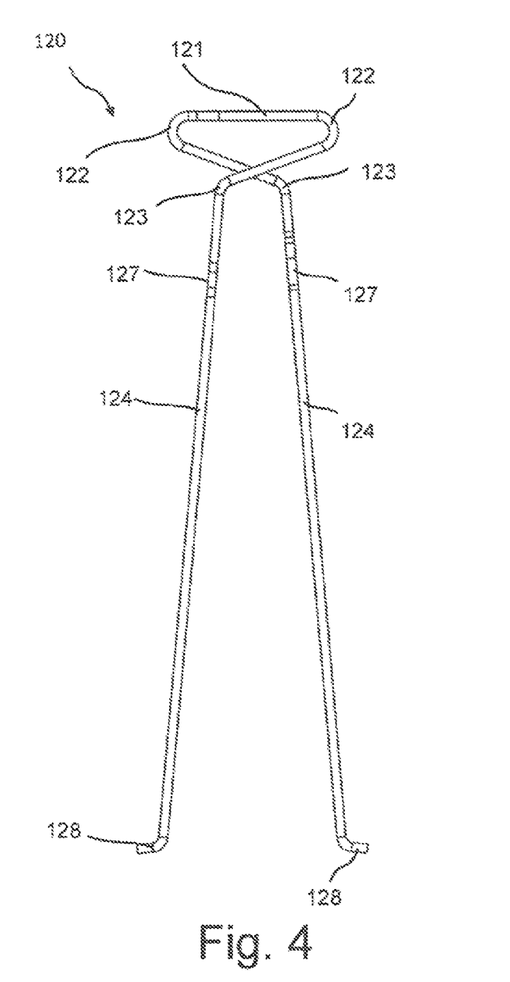
FIG. 4 is a side elevational view of the spring device of FIG. 3 from a direction corresponding to a direction of rotation of the brake disk.

The spring device 120 has a base 121 where the legs 124 engage. The legs 124 are disposed on opposite sides of the base 121 so as to be staggered such that they are disposed next to one another. Each of the legs 124 has a bending area 122 where the legs 124 extend by an angle of approximately 160 degrees in the direction of the other side of the base 121 where each of the legs 124 has a counter-bending area 123 where the legs 124 extend by an angle of approximately 70 degrees in the direction. As a result of the bending area 122 and the counter-bending area 123, the legs 124 extend from one side of the base 121 of the spring device 120 to the other side of the base 121 of the spring device 120 where they engage the opposite brake pad 110. The advantage in this configuration is that the pivot points of the legs 124 are positioned more favorably for transmitting power to the brake pads and, therefore, fewer legs or weaker legs or shorter legs can be used in contrast to the prior art and, therefore, a larger pad area is available or less available space is required. This is of advantage in particular for four-piston brake calipers having four individual pads where less building space is available due to the provision of individual pads. The formation of a four-piston brake caliper having four individual pads has the advantage that equal piston diameters can be provided for a uniform contact pressure of the pads to the brake disk. When only two brake pads (one for each side) are used, it is, however, desirable when pistons having different diameters are used to obtain similar contact forces in the front and rear areas of the brake pad, viewed in the running direction.

Figure 5:
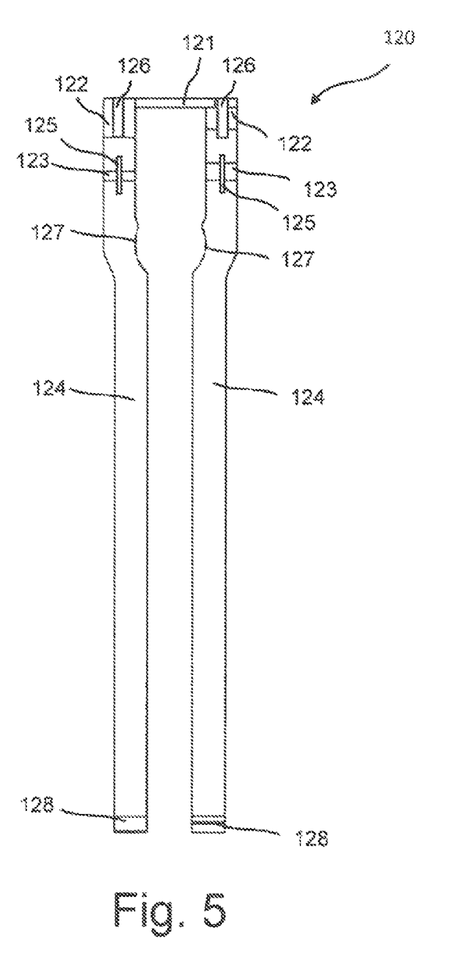
FIG. 5 is a side elevational view of an exemplary embodiment of a spring device of the brake caliper of FIG. 1 in, for example, a direction of piston movement.

As can best be seen in FIGS. 3 and 5, the legs 124 have corresponding locking portions 127 by which the spring device 120 clamps the shaft 151 of the bolt 150 to additionally secure the spring device 120.

Figure 6:
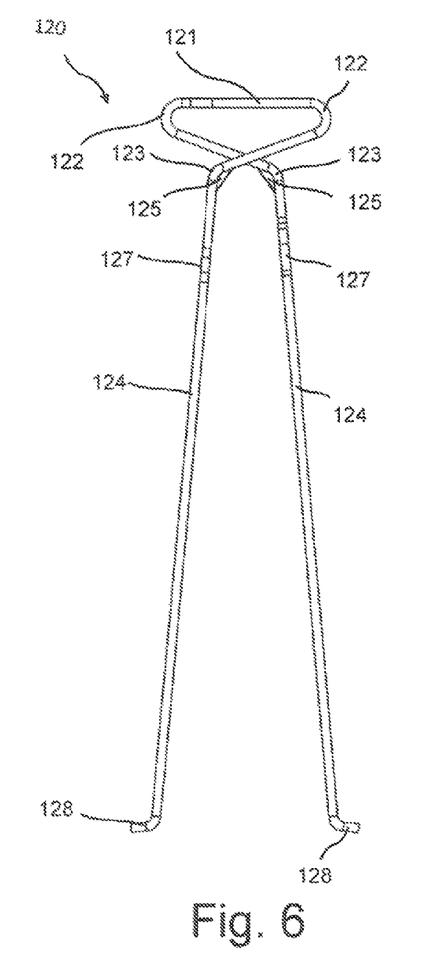
FIG. 6 is a side elevational view of the spring device of FIG. 5 from a direction corresponding to a direction of rotation of the brake disk.

FIGS. 5 and 6 show details of an alternative embodiment of the spring device, wherein, in connection with these figures, substantially only the differences with respect to the embodiments of the brake caliper that are described in connection with the other figures are explained and, as for the rest, reference is made to the description thereof.

According to the alternative embodiment shown in FIGS. 5 and 6, it can be advantageous to provide corrugations 126 in the bending area 122 of the legs 124 so that the pivot points of the legs 124 are moved further outwards due to the smaller bending resistance. Alternatively or additionally, it can be advantageous for the counter-bending areas 123 of the legs 124 to be provided with reinforcements 125 so that the legs 124 predominantly bend in the bending areas 122.

The brake caliper 100 has three bridges 130 that connect the cylinders 101 disposed on both sides of the brake disk (not shown) in known manner.

Figure 23:
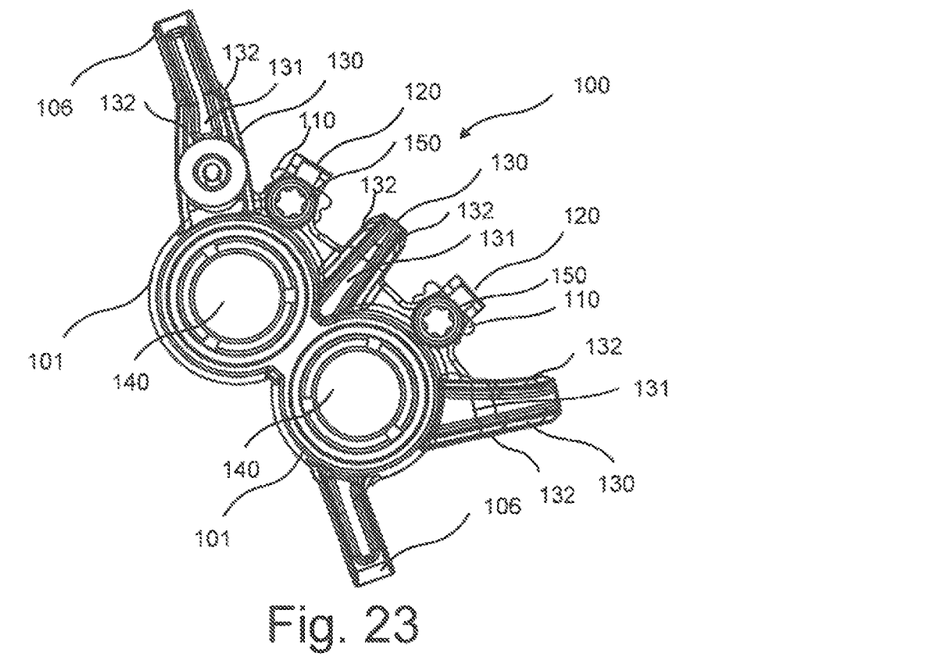
FIG. 23 is a side elevational view of the brake caliper of FIG. 1.

The edges of the bridges 130 are provided with cooling fins 132, between which a recess 131 is disposed. The advantage of this is that, compared to the prior art, a greater surface area is formed with greater rigidity that better cools the brake caliper.

Figure 24:
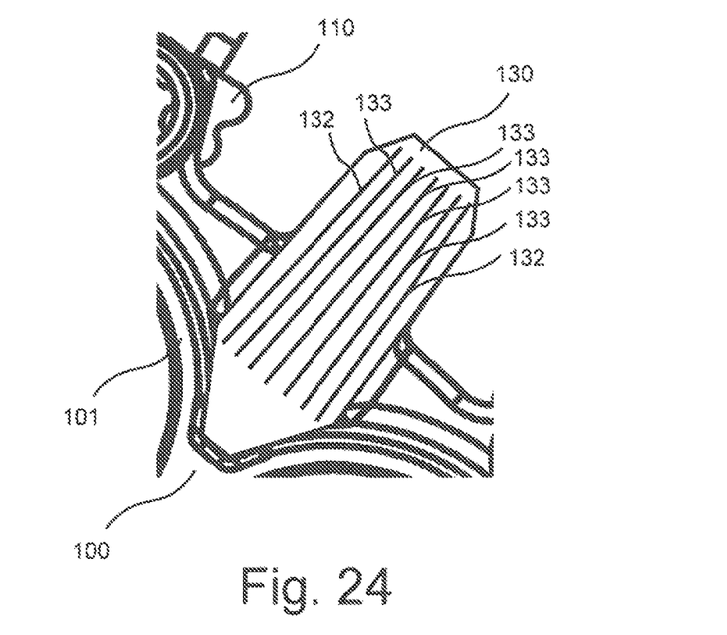
FIG. 24, is a fragmentary, enlarged, side elevational view of a portion of a brake caliper according to an alternative embodiment in a presentation that corresponds to the side view of FIG. 23 and shows differences with respect to the embodiment of the brake calipers of FIGS. 1 and 23

FIG. 24 shows details of an alternative embodiment of the invention, wherein, in connection with this figure, substantially only the differences with respect to the embodiments of the brake caliper that are described in connection with the other figures are explained and, as for the rest, reference is made to the description thereof.

According to the exemplary embodiment shown in FIG. 24, the bridge 130 is provided with several cooling fins 132 and 133 to achieve even greater cooling. Such cooling fins 132, 133 can be provided on one bridge 130 or on several bridges 130 or on all bridges 130.

FIGS. 16 to 20 show an exemplary configuration of the cover 140, by which the open cylinder 101 is closed. The brake caliper 100 has opposite cylinders 101, one of which is made in open fashion so that the pistons can be introduced into the cylinders 101. After the assembly of the pistons, the open side of the cylinder is closed by the cover 140. The cover 140 has a closure element 141 and a screen 142. During closing, the closure element 141 is screwed into a corresponding thread of the cylinder 101 by its threaded portion 143. For this purpose, a suitable tool can engage a tool engagement portion 144. Having closed the opening, the screen 142 can be inserted in the closure element 141. Advantageously, the screen 142 engages the tool engagement portion 144 and is mounted thereon.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The phrase "at least one of A and B" is used herein and/or in the following claims, where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables.

The foregoing description and accompanying drawings illustrate the principles, exemplary embodiments, and modes of operation of the systems and methods. However, the systems and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems and methods as defined by the following claims.

What is claimed is:

1. A brake caliper of a hydraulic brake system, comprising:
   a caliper body defining cylinders each having an axis;
   pistons each slidably arranged in a respective cylinder along an axis of the cylinder;
   brake pads positioned to be forced against a brake disk by the pistons upon actuation of the brake; and
   at least one spring device having a base and opposite legs that extend from the base to the brake pads, the opposite legs extending from a side of the base to a brake pad that is disposed on an opposite side, the brake pads having a divided brake pad, between which a groove extends to receive a leg of the at least one spring device.

2. The brake caliper according to claim 1, wherein the legs each have a bending region and a counter-bending region.

3. The brake caliper according to claim 2, wherein the bending regions extend over an angular range of one of:
   more than 120 degrees;
   more than 150 degrees; and
   approximately 160 degrees.

4. The brake caliper according to claim 2, wherein the counter-bending regions extend over an angular range of one of:
   more than 30 degrees;
   more than 60 degrees; and
   approximately 70 degrees.

5. The brake caliper according to claim 1, wherein:
   the pistons are four pistons;
   the cylinders are two opposite cylinder pairs; and
   the four pistons are disposed in the two opposite cylinder pairs.

6. The brake caliper according to claim 5, wherein the brake caliper has four brake pads, each of which is associated with one of the pistons.

7. The brake caliper according to claim 1, wherein the opposite legs of the spring device are staggered with respect to one another.

8. The brake caliper according to claim 1, wherein:
   the opposite legs abut the brake pads; and
   each of the opposite legs has a bending region and a length that is greater than a distance of the two corresponding opposite brake pads.

9. A brake caliper of a hydraulic brake system, comprising:
   a caliper body defining cylinders each having an axis;
   pistons each slidably arranged in a respective cylinder along an axis of the cylinder;
   brake pads positioned to be forced against a brake disk by the pistons upon actuation of the brake and having a lower edge; and
   at least one spring device having a base and opposite legs that extend from the base to the brake pads, the opposite legs extending from a side of the base to a brake pad that is disposed on an opposite side, the legs having ends and the ends having holding portions that engage on the lower edge of the brake pads.

10. The brake caliper according to claim 9, wherein:
the brake pads have a pad support with engagement openings; and
the holding portions engage in the engagement openings of the pad support.

11. The brake caliper according to claim 10, wherein:
the brake pads have recesses; and
the engagement openings are provided in the recesses of the brake pad.

12. The brake caliper according to claim 9, wherein the legs extend in a groove that is one of:
provided between pad parts of the brake pad; and
formed in the pad.

13. A brake caliper of a hydraulic brake system, comprising:
a caliper body defining cylinders each having an axis;
pistons each slidably disposed in a respective cylinder along the axis of the cylinder;
brake pads positioned to be forced against a brake disk by the piston upon actuation of the brake; and
at least one spring device having a base and opposite legs that extend from the base to the brake pads, the opposite legs being staggered with respect to one another, the brake pads having a divided brake pad, between which a groove extends to receive a leg of the at least one spring device.

14. The brake caliper according to claim 13, wherein the opposite legs extend from the side of the base to a brake pad that is disposed on the opposite side.

15. A brake caliper of a hydraulic brake system, comprising:
a caliper body defining cylinders each having an axis;
pistons each slidably arranged in a respective cylinder along an axis of the cylinder;
brake pads positioned to be forced against a brake disk by the pistons upon actuation of the brake; and
at least one spring device having a base and opposite legs that extend from the base to the brake pads, the legs each having a bending region and a counter-bending region, the brake pads having a divided brake pad, between which a groove extends to receive a leg of the at least one spring device.

16. A brake caliper of a hydraulic brake system, comprising:
a caliper body defining cylinders each having an axis;
pistons each slidably arranged in a respective cylinder along an axis of the cylinder;
brake pads positioned to be forced against a brake disk by the pistons upon actuation of the brake; and
at least one spring device having a base and opposite legs that extend from the base to the brake pads and abut the brake pads, each of the opposite legs having a bending region, a length of the legs being greater than a distance of the two corresponding opposite brake pads against which the legs abut, the brake pads having a divided brake pad, between which a groove extends to receive a leg of the at least one spring device.

17. A brake caliper of a hydraulic brake system, comprising:
a caliper body defining cylinders each having an axis;
pistons each slidably arranged in a respective cylinder along an axis of the cylinder;
brake pads positioned to be forced against a brake disk by the pistons upon actuation of the brake; and
bridges connecting opposite portions of the brake caliper and having at least one cooling fin, the brake pads having a divided brake pad, between which a groove extends to receive a leg of the at least one spring device.

18. A hydraulic brake, comprising
a hydraulic disk brake having:
a brake disk;
a brake caliper with:
a caliper body defining cylinders each having an axis;
pistons each slidably arranged in a respective cylinder along an axis of the cylinder;
brake pads positioned to be forced against the brake disk by the pistons upon actuation of the brake; and
at least one spring device having a base and opposite legs that extend from the base to the brake pads, the opposite legs extending from a side of the base to a brake pad that is disposed on an opposite side, the brake pads having a divided brake pad, between which a groove extends to receive a leg of the at least one spring device.

19. A brake caliper of a hydraulic brake system, comprising:
a caliper body defining an interior and cylinders each having an axis;
pistons each slidably arranged in a respective cylinder along an axis of the cylinder;
brake pads positioned to be forced against a brake disk by the pistons upon actuation of the brake; and
at least one spring device having a base and opposite legs that extend from the base to the brake pads, the opposite legs extending into the interior of the caliper body, the brake pads having a divided brake pad, between which a groove extends to receive a leg of the at least one spring device.

* * * * *